United States Patent [19]
Couvillon et al.

[11] 3,969,725
[45] July 13, 1976

[54] DISTANCE MEASURING EQUIPMENT

[75] Inventors: James Benedict Couvillon, Dallas; William Dorsey Daniels, Richardson; Ronald Lee Gassner, Richardson; Robert Allen Maher, Richardson, all of Tex.

[73] Assignee: The United States of America as represented by the Secretary of Transportation, Washington, D.C.

[22] Filed: June 12, 1974

[21] Appl. No.: 478,651

[52] U.S. Cl. .............................. 343/6.5 R; 343/7.3; 343/17.2 PC
[51] Int. Cl.² ........................................... G01S 9/56
[58] Field of Search .................. 343/6.5 R, 17.2 PC

[56] References Cited
UNITED STATES PATENTS

| | | |
|---|---|---|
| 3,573,819 | 4/1971 | Mason et al. ..................... 343/6.5 R |
| 3,648,285 | 3/1972 | Sanders ............................ 343/6.5 R |
| 3,654,554 | 4/1972 | Cook ............................ 343/6.5 R X |
| 3,680,089 | 7/1972 | Sanders ............................ 343/6.5 R |
| 3,780,370 | 12/1973 | Reeves ........................ 343/6.5 R X |
| 3,875,571 | 4/1975 | Davis, Jr. et al. ................ 343/6.5 R |

*Primary Examiner*—T.H. Tubbesing
*Attorney, Agent, or Firm*—Otto M. Wildensteiner

[57] ABSTRACT

Disclosed is improved distance measuring equipment comprising an airborne FM coded, chirp, interrogator transmitter in combination with a weighted matched receiver in a ground transponder. The airborne transmitter produces a long low power frequency modulated output pulse. Detection in the transponder receiver is accomplished by pulse compression matched filter techniques.

5 Claims, 9 Drawing Figures

Fig. 1

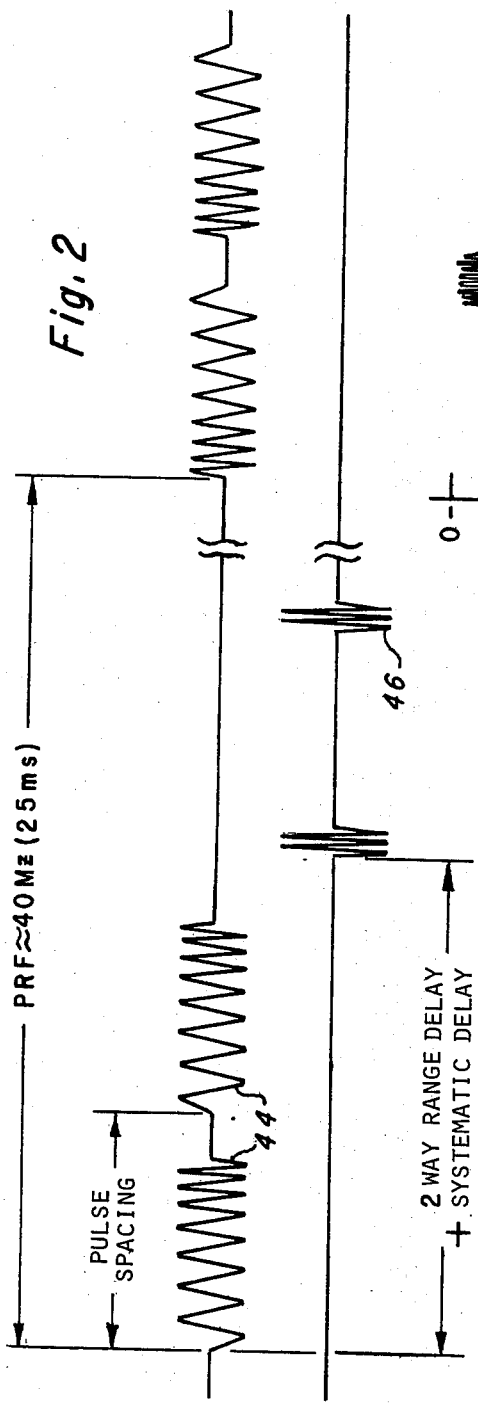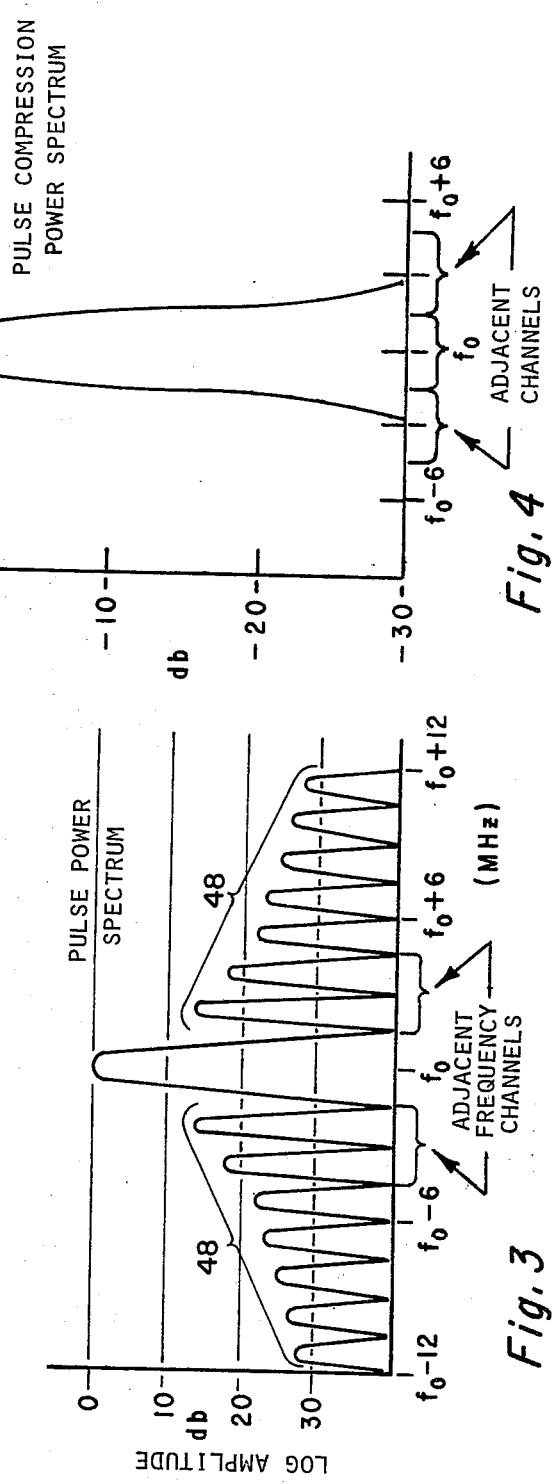

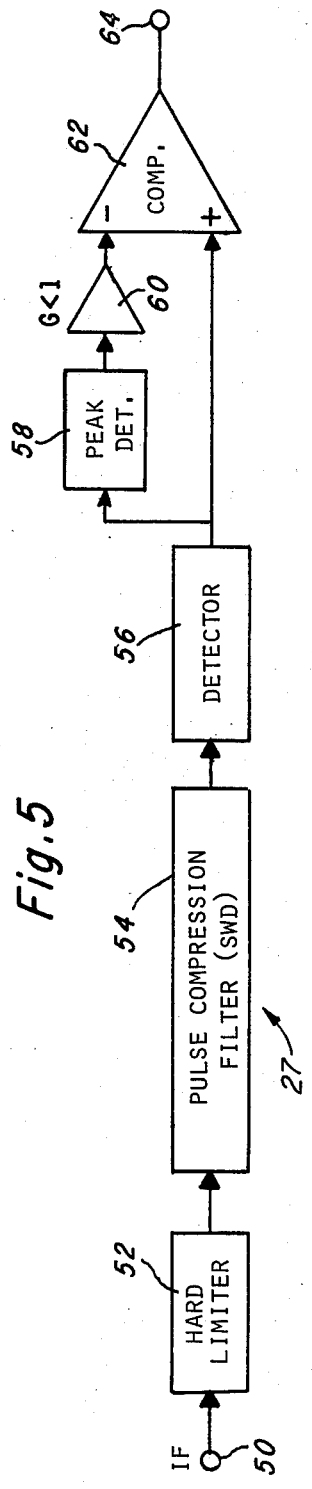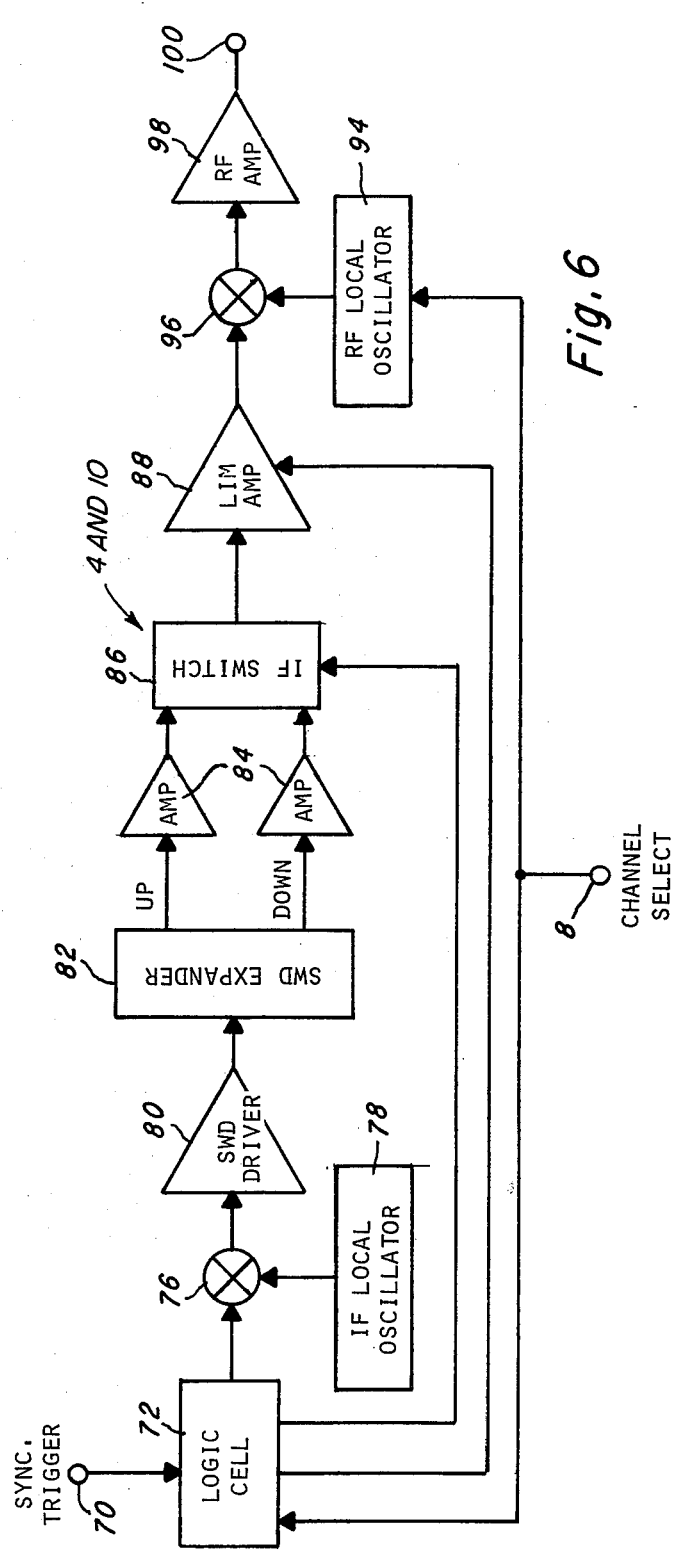
Fig. 5
Fig. 6

Fig. 9

DISTANCE MEASURING EQUIPMENT

This invention relates to distance measuring equipment for determining the distance from an aircraft to a ground position utilizing an interrogator and a transponder.

The basic concept of electronic distance mesuring equipment is well known in the art. The distance from an airborne interrogator to a ground transponder is proportional to the time of travel of RF, radio frequency, signals from the airborne interrogator to the ground transponder and back. The operation of a simple DME system begins when the airborne interrogator simultaneously starts a time counter and transmits a pulse of RF energy toward the ground transponder. The transponder receives the pulse of RF energy and after a fixed internal time lag transmits a pulse of RF energy back towards the interrogator. When the interrogator detects the return pulse it stops the counter which has then stored a signal proportional to the total time lapse from the transmission of the original pulse to reception of the return pulse. To determine range, the known internal time lags in the transponder and interrogator receivers are subtracted from the counter signal.

Very complex DME systems are required where there are a plurality of airborne interrogators and ground transponders all operating simultaneously within signal range of each other. The prior art solution to this complex situation has been to establish a plurality of channels of operation. The channels are defined by frequency band and by time spacing between pulse pairs which are transmitted instead of single pulses.

Nevertheless, a problem arises even in the basic operation of a DME system. Since the time intervals being measured are very short due to the high velocity of electromagnetic radiation, it is essential that the time of arrival of the RF pulses be accurately measured. The prior art time of arrival detection methods require that each RF pulse be detected and logarithmically amplified to form a video pulse whose peak is then stored. A portion of the pulse is delayed and time of arrival is registered when the delayed pulse amplitude reaches a value 6 db below the stored peak value. The time lost in the delayed signal causes no problem since it is a known fixed value which is removed from the final stored time delay. The detection of a new peak value for every received pulse does cause a problem due to amplitude jitter in the stored peak values. It is also difficult to generate true logarithmic amplification especially over a wide dynamic range as is normally encountered in DME systems. The time of arrival detection method also requires the transmission of fast rise time RF pulses and the use of wide bandwidth receivers to preserve the fast rise time of the received pulses. Then to achieve adequate range of operation, high peak power pulses must be transmitted. The interrogator pulses of prior art systems are typically 0.66 microseconds wide and have a peak power of 150 watts.

These pulse requirements cause several problems. One major problem is the excess size and weight of a transmitter capable of producing high power RF pulses. Weight and volume are critical items in any airborne system and must be reduced whenever possible. Another major problem is that only tube type transmitters are capable of producing the high peak power pulses required. Tube type transmitter inherently have short lifetimes and low reliability, resulting in frequent failures. It is not always practical to place a high power transmitter requiring frequent maintenance in close proximity to the antenna and significant amounts of energy are lost in the transmission lines coupling the antenna to the transmitter. In addition to these problems, the narrow pulse width desirable for tube-type transmitters generates a broad frequency spectrum which requires additional circuitry in the receiver to validate the true center frequency being received.

Accordingly, it is an object of the present invention to provide an improved DME system.

It is also an object of the present invention to provide a DME system using pulse compression techniques.

It is also an object of the present invention to provide a DME system having a highly accurate time of arrival detector.

It is another object of the present invention to provide a DME system having an airborne interrogator which transmits FM coded signals having a narrow frequency spectrum with essentially no overlap of adjacent channels.

It is yet another object of the present invention to provide a DME system having a low power interrogator transmitter comprised of all solid state components.

Briefly stated, the distance measuring equipment of the present invention comprises a frequency modulated pulse, chirp, interrogator transmitter in combination with a weighted matched filter, pulse compression, transponder receiver. The interrogator transmitter produces a chirp pulse having low peak power and wide pulse width. The transponder receiver pulse compression filter converts the received chirp pulse into a short pulse with enhanced signal to noise ratio. The pulse compression filter responds only to pulse compression signals at the preselected carrier frequency and thus eliminates any interference from adjacent frequency channels.

Other objects, features and advantages of this invention will become better understood by reference to the following detailed description when read in conjunction with the accompanying drawings wherein:

FIG. 2 is a timing diagram of the interrogator and transponder transmitter waveforms.

FIG. 3 is a plot of the frequency spectrum of the transponder transmitter pulses.

FIG. 4 is a plot of the frequency spectrum of the interrogator transmitter pulses.

FIG. 5 is a block diagram of the limiter/pulse compressor 27 of FIG. 1.

FIG. 6 is a more detailed block diagram of elements 4 and 10 of FIG. 1.

FIG. 9 is a schematic diagram of element 54 of FIG. 5, showing the "up" and "down" surface wave device matched filters followed by the pulse spacing decoders used to realign the decoded pulse in time.

Figure 1:
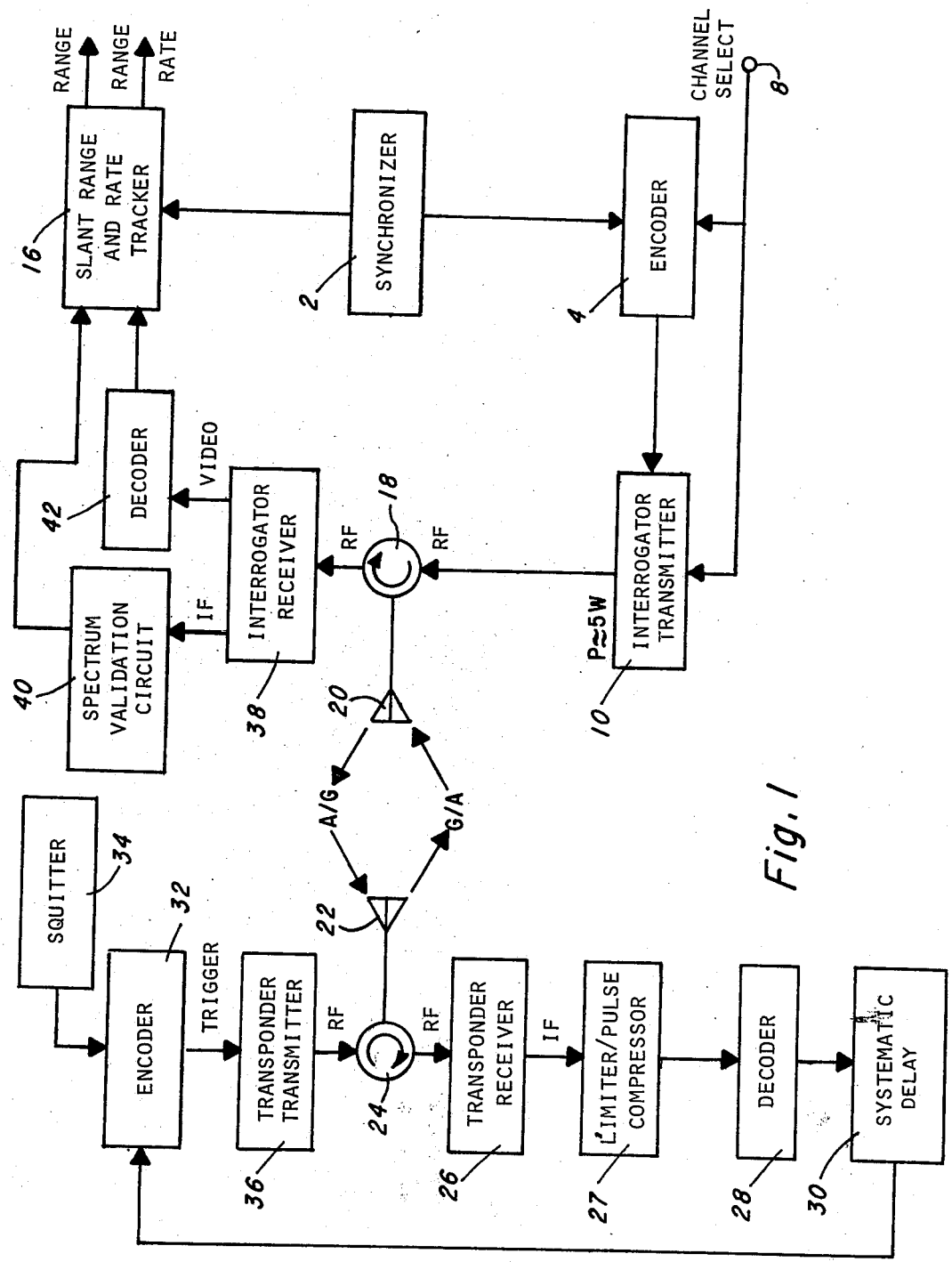
FIG. 1 is a general block diagram of the distance measurement equipment of the present invention.

FIG. 1 is a block diagram of the preferred embodiment of the improved distance measuring equipment of the present invention. The operation of this system to make a single range measurement begins with a signal generated by a synchronizer 2. The synchronizer signals have an average rate of 40 hertz but are randomly jittered about the 40 hertz repetition rate so that each airborne interrogator will have a unique interrogation rate. The synchronizer 2 output is coupled to a range tracker 16 to start a time counter which continues counting until a return pulse is received from a transponder.

The synchronizer 2 signal also causes an encoder 4 to produce two bursts of FM coder IF signal. The encoder 4 output is coupled to an interrogator transmitter 10 where it is mixed with an RF carrier signal and the product is amplified to a power level of about five watts. The RF output of transmitter 10 is coupled through circulator 18 to an antenna 20 to be radiated to a transponder, which for the preferred embodiment is located at a ground station.

The pulse spacing of encoder 4 and the frequency of the RF carrier signal of transmitter 10 are preselected by the operator by setting a channel selector switch which is coupled to input 8. Each transponder operates at only a single pulse spacing and RF carrier frequency so that the channel selection is the means of selecting a particular transponder to be interrogated.

Since FM coding may be either increasing or decreasing frequency modulation, that is up-chirp or down-chirp, channels may also be defined according to the direction of FM coding. Since pulse pairs are transmitted, there are actually four possible interrogation signal formats, that is up/down, down/up, up/up, and down/down. The full benefit of this additional channelization factor can be realized only by trading off some accuracy due to the well-known inherent time-frequency coupling of the chirp waveform.

The first pulse of each pulse pair is termed the measurement pulse since the leading edge of the first pulse is detected as the time of pulse arrival. In the preferred embodiment of the present invention the chirp direction of the measurement pulse is changed on alternate interrogations so that FM errors have equal amplitude and opposite sign and cancel each other in the range tracker 16. Thus in the preferred embodiment, for each carrier frequency/pulse spacing combination, two channels may be defined by the chirp coding; one by the use of the same chirp direction for both pulses and one by use of the opposite chirp directions within each pulse pair.

The interrogator signal is received by transponder antenna 22 and coupled by circulator 24 to the transponder receiver 26. The receiver 26 comprises an RF amplifier, a local oscillator, a mixer, and an IF amplifier to produce and IF, intermediate frequency, signal at about 61.8 megahertz.

The IF signal is coupled to a limiter/pulse compressor 27, which produces video output pulses with leading edges corresponding to the time of arrival of interrogator RF pulses. The limiter/pulse compressor 27 comprises a limiter amplifier, a pulse compression filter, and amplitude detector and a level detector. The limiter amplifier amplifies substantially all IF signals, both noise and received RF pulses, to a single amplitude level below the normal noise level. The pulse compression filter increases the amplitude of properly FM coded signals and attenuates all other signals to provide a signal to noise ratio of 14 db at its output. The pulse compressed IF signal is amplitude detected by the detector which provides a video representation of the IF signal. The detector output is coupled to a level detector which produces an output when the detected pulses reach a level 9 db below the peak detected pulse level.

The video pulses from limiter/pulse compressor 27 are coupled to a decoder 28 which generates an output only if two pulses with the proper pulse spacing are received. The decoder output triggers a systematic delay 30 which after a fixed time delay triggers an encoder 32. The encoder 32 responds to the trigger signal by producing two pulses at a preselected pulse spacing which cause a transponder transmitter 36 to produce two bursts of RF signal at a preselected frequency. A squitter 34 also triggers the encoder 32 randomly so that the transponder transmitter will produce output pulses at a minimum rate. These random pulses provide interrogators which are attempting to acquire contact with this transponder with a signal for proper setting of receiver AGC loops. The transponder transmitter 36 outputs pulses are coupled by circulator 24 to antenna 22 to be transmitted back to the interrogator.

The interrogator antenna 20 receives the signals from the transponder and circulator 18 couples these to be interrogator receiver 38. Since the pulses transmitted from the transponder are the conventional fast rise-time narrow pulse signals the airborne interrogator receiver is also conventional. The interrogator 38 comprises a local oscillator, a mixer, an IF amplifier with AGC and a detector. The received signals have a broad frequency spectrum due to the narrow pulse width and fast rise time and a spectrum validation circuit 40 is required to insure that the received pulses are at the proper frequency. The IF signal is fed to the spectrum validation circuit which produces a validation output signal for the range tracker 16 if the frequency is correct. The detected IF signal is fed to a decoder 42 which detects the time of arrival of each pulse and measures the pulse spacing. If the pulse spacing is correct, decoder 42 produces a second validation signal which is also coupled to the range tracker 16.

Upon receipt of the first pulse of the pulse pair, the range tracker 16 stops counting time and at that point has stored the travel time of the air to ground and ground to air RF signals plus the transponder systematic delay and the interrogator receiver delay. By subtracting the fixed time delays from the stored time in the range tracker 16 an output proportional to the range from the airborne interrogator to the transponder is produced. Upon receipt of both validation pulses the range tracker 16 updates its track loop with the just measured range. The absence of one or both validation pulses causes the range tracker 16 to discard the just measured value and update the track loop with a predicted value of range. By taking more readings sequentially, the up-chirp errors cancel the down-chirp errors and an output corresponding to the change in distance or range rate is also produced.

FIG. 2 illustrates the preferred waveforms of the RF pulses transmitted by the interrogator and the transponder and their relative time sequence. Waveform 44 illustrates the linearly FM coded interrogator transmitter pulses. In the preferred embodiment pulses 44 are 10 microseconds wide and have minimum pulse spacing of 12 microseconds. The peak power of the interrogator pulses is five watts.

The transponder waveform 46 is the conventional transponder type signal and is similar to the prior art interrogator signals. The pulses 46 are single frequency bursts, 0.66 microseconds wide and have a peak power of 2 kilowatts. The minimum spacing of transponder pulses 46 is twelve microseconds.

FIG. 3 illustrates the frequency spectrum of the transponder pulses 46 illustrated in FIG. 2. The carrier frequency spacing is typically 3 megahertz between adjacent DME channels. This frequency spectrum provides a spectrum null at the center of the adjacent channels but the side lobes 48 may cause the transponder to respond to adjacent channel interrogation signals. To prevent such responses the interrogator spectrum validation circuit 40 of FIG. 1 is required to verify the true center frequency of the received signals.

FIG. 4 illustrates the frequency spectrum of the interrogator pulses 44 of FIG. 2. This spectrum is very compact with essentially no side lobes which could cause erroneous signal detection on adjacent channels. Since there is no side lobe problem, as in prior art systems, the transponder receiver of the present invention has no spectrum validation circuits. The bandpass pulse compression filter in the limiter/pulse compressor 27, FIG. 1, will only pass signals on a single preselected carrier frequency and provides gain only for those with the proper FM coding.

FIG. 5 is a block diagram of the limiter/pulse compressor 27 of FIG. 1. The IF output of the transponder receiver 26 of FIG. 1 is coupled to input 50 of a hard-limiting amplifier 52. The limiting amplifier 52 produces an essentially constant voltage amplitude output for any input signal level. The output of amplifier 52 is coupled to pulse compression filter 54. The preferred pulse compression filter is a surface wave device, SWD, which matches the FM coding of interrogator transmitted pulses. The pulse compression filter 54 adds 12 db of gain to the amplitude of pulses at the proper center frequency and with the proper FM coding. All other signals, including thermal noise, adjacent channel receptions, and opposite direction chirp signals are attenuated 2 db in passing through the filter 54. Thus the signal to noise ratio is improved by 14 db by filter 54. Since the limiter 52 output has constant level for all signals, the filter 54 output will have two levels according to whether properly FM coded pulses are received or only noise is present. These levels are about 14 db apart.

Figure 9:
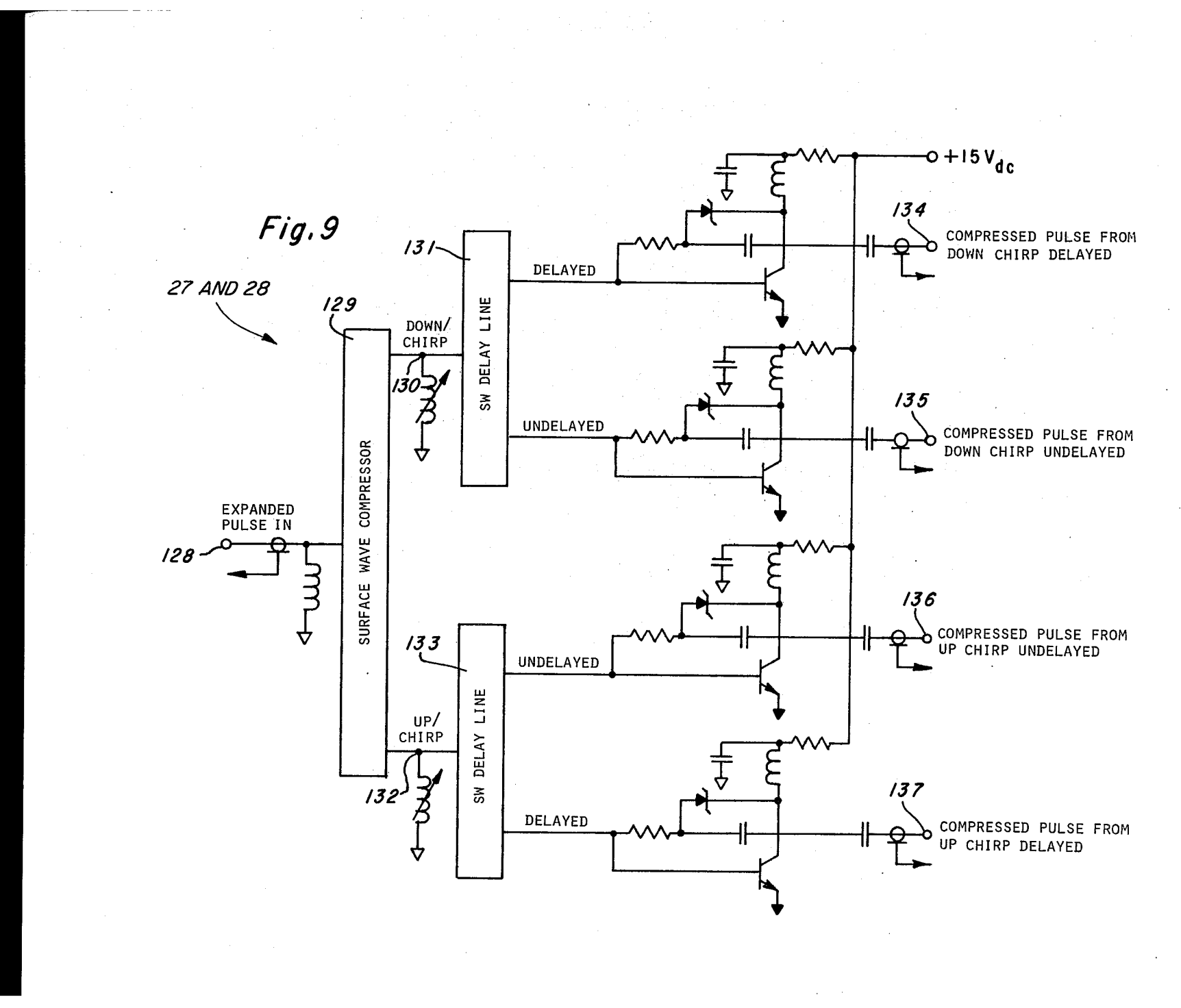

If additional channels are desired, it will be apparent from FIG. 9 that linear FM coding with a negative slope (decreasing frequency versus time) is simultaneously available from the pulse compressor 27 for processing in additional circuitry comprising a detector, a peak detector, amplifier, and comparator such as the above elements 56, 58, 60, and 62.

The output of filter 54 is coupled to amplitude detector 56 which produces a video representation of the filter 54 output. This video output has an essentially constant base level with constant amplitude pulses corresponding to received interrogator RF pulses.

As in prior art systems the time of arrival of a received pulse is registered at the time the detected pulse leading edge passes a predetermined level, usually one half of the maximum pulse amplitude. The prior art time of arrival detection techniques are fully applicable to the video pulse output of detector 56. However the simpler time of arrival detector comprising peak detector 58, amplifier 60, and comparator 62 shown in FIG. 5 is preferred where less precise measurement accuracy is acceptable. Since all compressed and detected pulses have essentially constant amplitude, and integrating peak detector 58 is used to generate a voltage level corresponding to the peak pulse amplitude. This stored peak value is coupled to amplifier 60 where it is reduced by typically 9 db. The reduced peak value is coupled to one input of a comparator 62. The video pulses from the output of detector 56 are coupled directly to the other input of comparator 62. The output 64 of comparator 62 will change levels whenever a received pulse is above a level 9 db below the average peak pulse level stored in peak detector 58.

FIG. 6 is a more detailed block diagram of encoder 4 and interrogator transmitter 10 of FIG. 1. The trigger signal from synchronizer 2 of FIG. 1 is coupled to an input 70 of a logic cell 72 of the encoder. The channel select input is also coupled to the logic cell from input 8. In response to these two inputs the logic cell produces two 0.66 microsecond wide pulses having a pulse spacing of between 12 and 30 microseconds in increments of 2 microseconds. This pulse pair is applied to one input of a mixer 76. A local oscillator 78 having a fixed frequency of 61.8 megahertz supplies a second input to mixer 76. The output of mixer 76 is thus two 0.66 microsecond bursts of 61.8 megahertz sine wave signal. The mixer 76 output is coupled to the input of the surface wave device driver 80. The driver 80 drives the input of the surface wave device expander 82. The expander 82 produces two outputs, one having a linearly increasing frequency coding and the other having a linearly decreasing frequency coding. These outputs are termed the up/chirp signal and the down/chirp signal, respectively. Each of these chirp signals is 10 microseconds wide and is frequency coded over the range 60.3 megahertz to 63.3 megahertz. This three megahertz bandwidth corresponds to the bandwidth of each DME channel. Both the up/chirp and the down/chirp signals are amplified in amplifiers 84 and then coupled to the inputs of a single pole double throw switch 86. The switch 86 position is controlled by another output of logic cell 72. The logic cell changes the switch position so that the up/chirp and down/chirp signals are allowed to pass through IF switch 86 in accordance with the selected channel format. The output of switch 86 is coupled to a limiter amplifier 88. This limiter amplifier 88 removes all amplitude modulation which is present on the chirp pulses and insures constant amplitude throughout the entire 10 microsecond chirp pulse width. Limiter amplifier 88 is also gated by another output from logic cell 72. This gating signal limits the output pulse to a precise 10 microsecond length and prevents any noise between pulses from reaching RF amplifier 98.

The output of limiter amplifier 88 is coupled to one input of mixer 96. A local oscillator 94 having a frequency near five gigahertz supplies a second input to mixer 96. The channel select input coupled to input 8 controls the exact frequency of oscillator 94 which is typically one of 20 frequencies spaced 3 megahertz apart. The output of mixer 96, which is a pair of 10 microsecond pulses having a center frequency near five gigahertz with a 3 megahertz linear frequency code, is applied to the input of RF power amplifier 98. Amplifier 98 provides approximately 5 watts of peak RF power at output 100 which is coupled to circulator 18 of FIG. 1.

Figure 7:
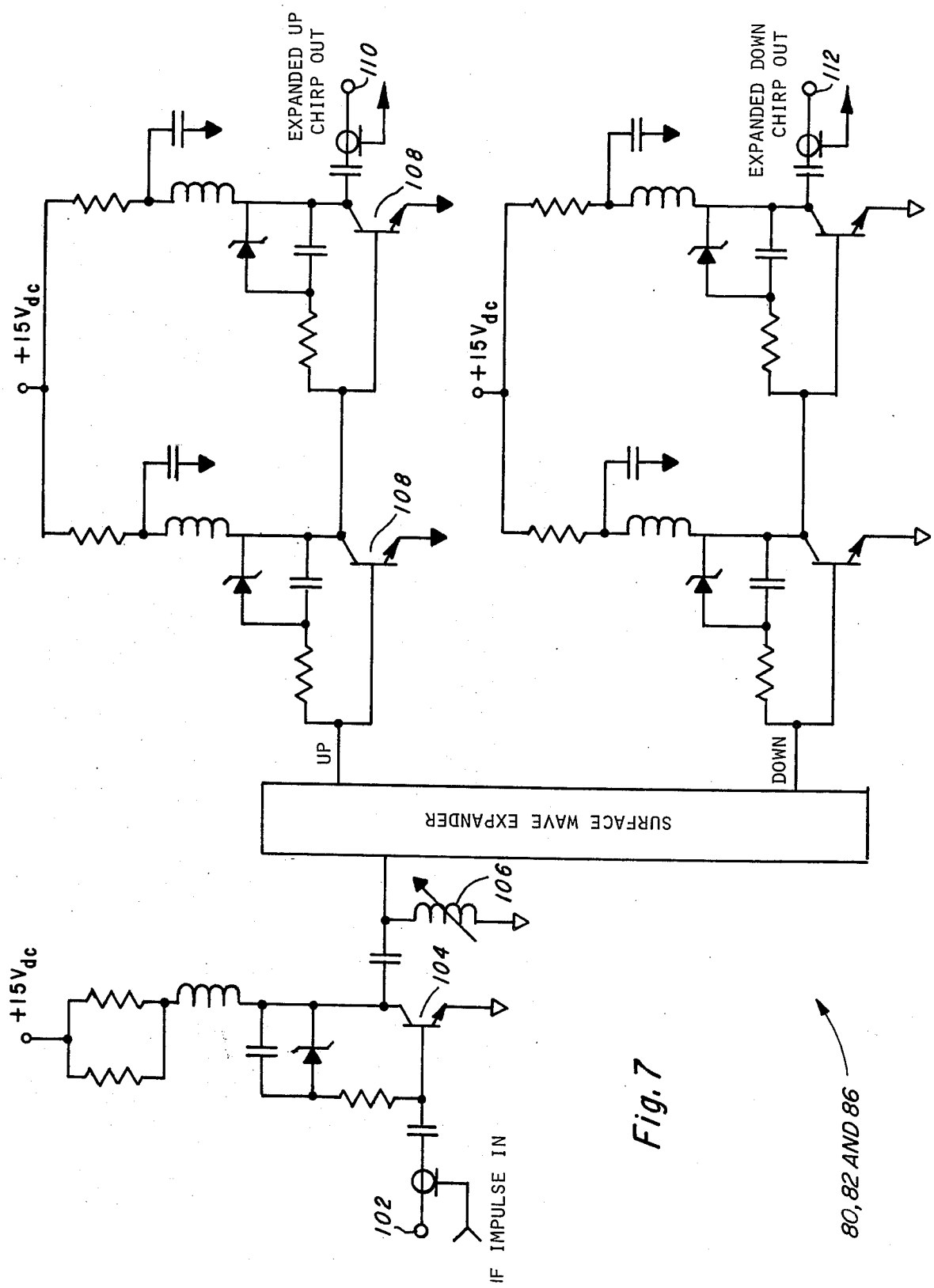
FIG. 7 is a schematic diagram of elements 80, 82, and 84 of FIG. 6.

FIG. 7 is a detailed schematic diagram of elements 80, 82 and 84 of FIG. 6. The 0.66 microsecond IF impulse from mixer 76 is coupled to input 102 of a surface wave device driver amplifier. This amplifier is a shunt feedback common emitter amplifier comprising one transistor 104. This amplifier provides amplification of the input signal and isolation of the actual surface wave device input from the mixer output. The amplifier output drives the input of the surface wave device to which is also coupled an inductor 106. The inductor 106 is used to tune the surface wave device input which is inherently capacitive. The surface wave device expands the 0.66 microsecond IF pulses into linearly FM coded 10 microsecond pulses. Both up/chirp and down/chirp signals are generated simultaneously. Each of the surface wave device outputs is coupled to a two stage shunt feedback common emitter amplifier each employing a single transistor 108. These amplifiers provide both gain and isolation for the surface wave device outputs. The amplified up/chirp signal appears at output 110 and the amplified down/chirp signal appears at output 112.

Figure 8:
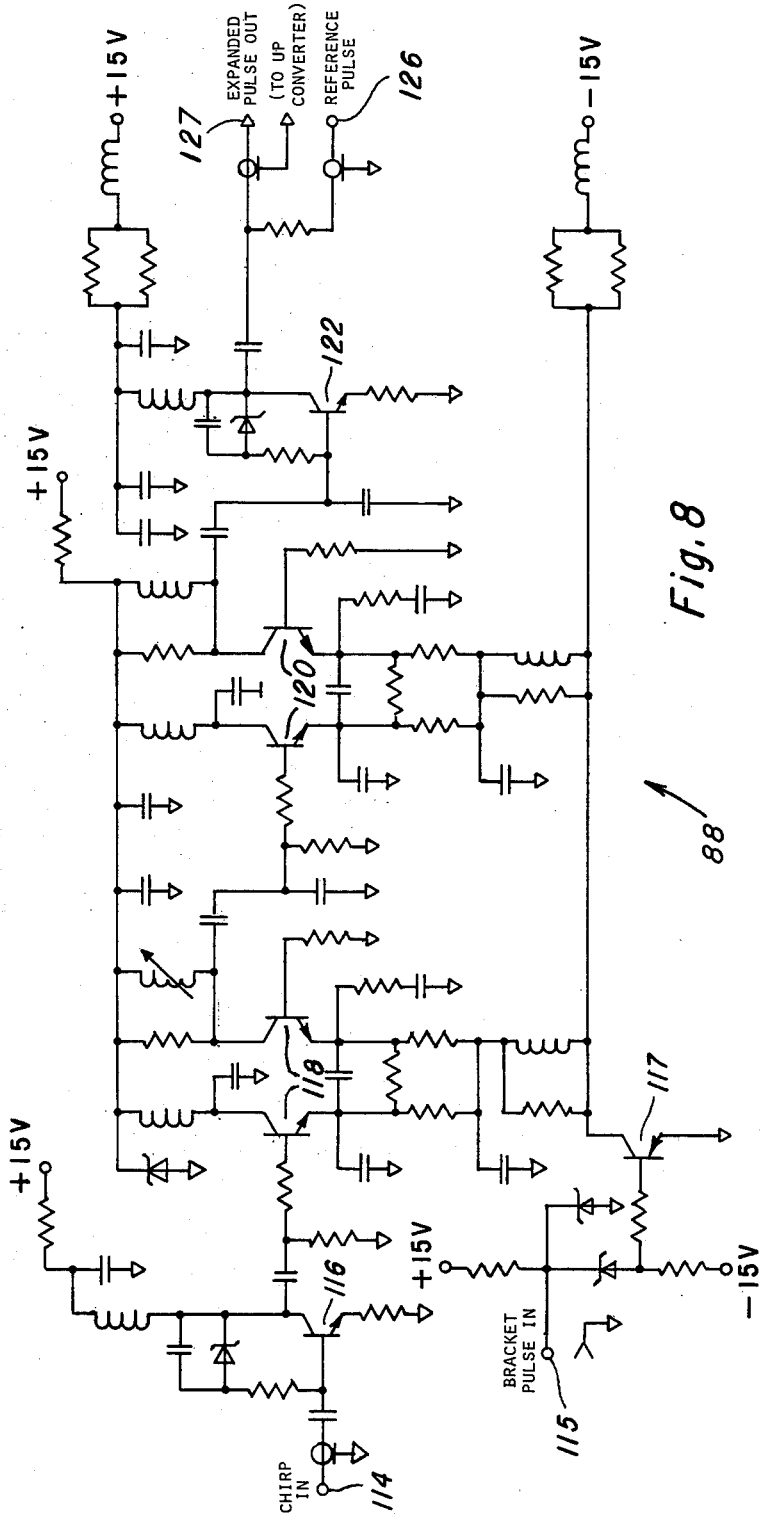
FIG. 8 is a schematic diagram of element 88 of FIG. 6.

FIG. 8 is a schematic diagram of a limiter amplifier which may be used for limiter amplifer 88 of FIG. 6. The up/chirp or down/chirp signal which passes through IF switch 86 of FIG. 6 is coupled to input 114. This input is coupled to a shunt feedback common emitter amplifier comprising one transistor 116. This first amplifier stage buffers the input and the signal from the collector of transister 116 is coupled to the first limiter stage comprising differential transistor pair 118. The output of the first limiter stage is coupled to a second limiter stage comprising differential transistor pair 120. The output of this second limiter stage is coupled to the input of a shunt feedback common emitter transistor amplifier comprising one transistor 122. The signal at the collector of transistor of 122 is coupled to output 124 which is connected to mixer 96 of FIG. 6. The gating pulse output from logic cell 72 of FIG. 6 is coupled to input 115. From input 115 the gating pulse is coupled to the base of transistor 117 which drives the negative power supply of transistor pairs 118 and 120 to ground potential between pulse transmissions. Signals are allowed to pass through amplifier 88 only during the 10 microsecond periods when expanded pulses are present at the outputs of pulse expander 82 of FIG. 6. The effect of this gating is to shape the leading and trailing edges of the expanded pulse into a substantially perfect square wave envelope. Noise from sources such as surface wave reflections within the pulse expander are also prevented from passing through the limiter amplifier to the interrogator transmitter 10, FIG. 1.

Output signal 127 is the signal from amplifier 88 to mixer 96 of FIG. 6. This signal, when combined with the signal from the local oscillator, forms the interrogator transmit frequency. The transmit frequency can either the sum or the difference of these frequencies.

Output 126 is sent to a matched filter surface wave device in interrogator receiver 38. After passing through pulse compression spectrum validation circuit 40 and decoder 42 this signal represents zero range and is used to start the range counter in range tracker 16.

The limiter amplifier illustrated in FIG. 8 is also suitable for use as the hard limiter 52 of FIG. 5. Since hard limiter 52 is part of the transponder receiver circuits it must operate over a large range of input amplitudes and must therefore have higher gain. The limiter amplifier differential stages may be cascaded as necessary to provide additional gain, and a total of eight stages are used in the preferred embodiment of limiter 52.

FIG. 9 is a schematic diagram of a section of the preferred circuitry which performs part of the functions of limiter/pulse compressor 27 and decoder 28 of FIG. 1. The limited IF signal from limiter 52, FIG. 5, is coupled to input 128 of a surface wave device compressor 129. Compressor 129 has two outputs for compressed pulses. Down/chirp pulses appear at output 130, up/chirp pulses appear at output 132. The up/chirp and down/chirp outputs are coupled to the inputs of surface wave delay lines 133 and 131, respectively. Each delay line has two outputs and the input signal will appear at both outputs, but with a different time delay at each. The difference in time delay between the two outputs is equal to the pulse spacing of the channel on which the transponder is operating plus 1 microsecond for decoding. When a properly spaced pulse pair is received, the second pulse of the pair appears at the undelayed delay line output one microsecond prior to the appearance of the first, or measurement, pulse at the delayed output. The one microsecond additional delay insures that the time of arrival detection will measure the arrival of the leading edge of the measurement pulse. Each of four surface wave delay line outputs is buffered and amplified by a shunt feedback one transistor common amplifier. The four amplified outputs appear at outputs 134 through 137. In the preferred embodiment the four outputs 134 through 137 are the actual output of pulse compression filter 54 of FIG. 5. Each output is coupled to circuitry comprising an AM detector, a peak detector, amplifier, and comparator such as elements 56, 58, 60 and 62, respectively, of FIG. 5. Thus, in the preferred embodiment, there are four video pulses coupled to decoder 28 of FIG. 1. In this preferred embodiment, decoder 28 contains no delay line or time measurement elements. Decoder 28 comprises only digital logic circuitry. When a pulse occurs on an undelayed delay line output the decoder generates a bracket pulse centered on the expected time of arrival of a delayed pulse. The occurrence of a delayed measurement pulse within the bracket pulse indicates reception of a properly spaced pulse pair and the decoder then generates a validation pulse for the systematic delay circuit 30 of FIG. 1.

If the interrogation signal format is like that shown in FIG. 2 with both pulses of each pair having the same chirp direction, the decoder 28 searches for a delayed measurement pulse output from the same delay line from which it receives an undelayed video pulse output. If the other signal format is used, that is, up/down and down/up chirp direction, the decoder 28 searches for a delayed measurement pulse output from the opposite delay line from which it receives an undelayed video pulse output.

Although the present invention has been shown illustrated in terms of specific apparatus, it will be apparent that changes or modifications can be made without departing from the spirit and scope of the invention as defined by the appended claims.

What is claimed is:

1. Distance measuring equipment for measuring the distance from an airborne interrogator to a ground based transponder comprising;
    an interrogator encoder for providing a linear frequency modulated pulse modulated signal with selectable slope sign;
    interrogator transmitter means for mixing a preselected radio frequency signal with the interrogator encoder pulse and transmitting the resulting radio frequency pulse;
    transponder receiver means for receiving interrogator transmissions and providing an intermediate frequency output in response thereto;

a matched pulse compression filter coupled to the transponder receiver for providing time compression and signal to noise gain for intermediate frequency signals having a preselected center frequency and linear frequency modulated frequency modulation with separate detection for both modulation slope signs;

transponder decoder means coupled to the pulse compression filter for detecting the arrival of the leading edge of a received pulse and providing an output pulse indicating said arrival;

transponder transmitter means coupled to said transponder decoder means for transmitting a pulse of radio frequency signals at a preselected frequency in response to the decoder output;

interrogator receiver means for receiving transponder transmissions and providing an intermediate frequency output in response thereto;

interrogator decoder means coupled to the interrogator receiver for detecting the arrival of a transponder pulse having a preselected center frequency and providing an output indicating said arrival; and range calculating means coupled to the interrogator encoder and the interrogator decoder for measuring the time between an interrogator transmission and reception of a transponder transmission and providing an output proportional to the distance from the interrogator to the transponder.

2. Distance measuring equipment according to claim 1 wherein the interrogator encoder comprises a local oscillator, a one-shot for providing a preselected width video pulse, a mixer coupled to the local oscillator and one shot for providing a pulse of intermediate frequency signal having the preselected width, and a surface wave device pulse expander coupled to the mixer for providing a time expanded frequency modulated output pulse.

3. Distance measuring equipment according to claim 1 wherein the pulse compression filter comprises a surface wave device.

4. Distance measuring equipment according to claim 1 wherein the transponder receiver means includes a limiter amplifier for limiting the amplitude of the intermediate frequency output to a single preselected level.

5. In distance measuring equipment for measuring the distance from an airborne interrogator transmitter to a ground based transponder receiver, the method of providing pulsed radio frequency interrogation signals comprising: time expanding and linear frequency modulating said radio frequency pulses transmitted by said interrogator transmitter; time compressing and frequency demodulating said radio frequency pulses received by said transponder; and reversing said linear frequency modulation of said pulses on alternate interrogations in order to cancel transmission errors.

* * * * *